(12) United States Patent
Carlson

(10) Patent No.: US 7,077,001 B2
(45) Date of Patent: Jul. 18, 2006

(54) MEASUREMENT OF COUPLED AERODYNAMIC STABILITY AND DAMPING DERIVATIVES IN A WIND TUNNEL

(75) Inventor: Mark A. Carlson, Amherst, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 10/983,440

(22) Filed: Nov. 8, 2004

(65) Prior Publication Data
US 2006/0096364 A1    May 11, 2006

(51) Int. Cl.
*A63B 53/00*    (2006.01)

(52) U.S. Cl. .................................. 73/170.01

(58) Field of Classification Search ............. 73/147, 73/865.6, 170.01; 356/150; 702/93, 138
See application file for complete search history.

(56) References Cited

U.S. PATENT DOCUMENTS

| | | | |
|---|---|---|---|
| 3,583,815 A * | 6/1971 | Kersey, Jr. ................ | 356/150 |
| 4,599,897 A * | 7/1986 | Hunter ...................... | 73/865.3 |
| 4,920,791 A | 5/1990 | Griffin | |
| 5,113,696 A | 5/1992 | Mole | |
| 5,331,578 A * | 7/1994 | Stieler ....................... | 702/93 |
| 5,398,885 A | 3/1995 | Andersson et al. | |
| 5,663,497 A * | 9/1997 | Mole ......................... | 73/147 |
| 5,731,995 A * | 3/1998 | Benne et al. .............. | 702/138 |
| 2003/0000298 A1 | 1/2003 | Heisler et al. | |

OTHER PUBLICATIONS

Mark A. Carlson; "Miniature Inertial Measurement Technology Applied to Mass Model Expendable Devices", Lockheed Sanders, Inc.; Mar. 23, 1995.
Mark A. Carlson; "Miniature Inertial Measurement Technology Applied to Mass Model Expendable Devices", Sanders, A Lockheed Martin Company, May 6, 1997.

* cited by examiner

Primary Examiner—Jewel V. Thompson
(74) Attorney, Agent, or Firm—Michael Sand; Daniel J. Long

(57) ABSTRACT

An apparatus for measuring coupled aerodynamic stability and damping derivatives of an object, such as a missile, towed decoy, etc. in a wind tunnel. The object is mounted on a bearing in the wind tunnel and contains an instrumentation package which provides a plurality of signals for determining coupled moment derivatives. The package includes three rate sensors, three accelerometers, and two thermal detectors for measuring the time rate of change of the full six degree of freedom state vector for aerodynamic derivatives.

20 Claims, 7 Drawing Sheets

FIG-10

FORCE
- $C_x$ – LONGITUDINAL FORCE
- $C_y$ – LATERAL FORCE
- $C_z$ – VERTICAL FORCE

MOMENT
- $C_m$ – PITCHING MOMENT
- $C_l$ – ROLLING MOMENT
- $C_n$ – YAWING MOMENT

DAMPING
- $C_{mq}$ – PITCH DAMPING
- $C_{lp}$ – ROLL DAMPING
- $C_{nr}$ – YAW DAMPING

ROTARY DERIVATIVES
- $C_{np}$ – YAW MOMENT DUE TO ROLL RATE
- $C_{lr}$ – ROLL MOMENT DUE TO YAW RATE
- $C_{yp}$ – SIDE FORCE DUE TO ROLL RATE
- $C_{yr}$ – SIDE FORCE DUE TO YAW RATE $p$ = ROLL RATE
$q$ = PITCH RATE
$r$ = YAW RATE

COORDINATE FRAME: RIGHT HAND, ORTHOGONAL WITH $X^+$ FWD, $Y^+$ TO STARBOARD, $Z^+$ DOWN, MOMENTS FOLLOW RIGHT HAND RULE

MEASUREMENT OF COUPLED AERODYNAMIC STABILITY AND DAMPING DERIVATIVES IN A WIND TUNNEL

BACKGROUND OF THE INVENTION

1. Technical Field

The invention relates to a low cost alternative to the measurement and evaluation of rotary and damping aerodynamic derivatives in a wind tunnel. More particularly, the invention relates to an approach which combines miniature inertial measurement technology with signal processing techniques to allow coupled derivatives and damping terms to be measured. This approach is adapted to existing oscillation techniques for simplifying the measurement approach in lieu of complex heretofore used forced oscillation flexure balances. Single degree of freedom, as well as three degree of freedom damping measurements can be made, and measurement of coupled force and moment coefficients also is possible by modification to the sting adaptor, allowing full advantage of the six degree of freedom capability of the measurement apparatus to be taken.

2. Background Information

In the design of bodies which move through the air, various factors are considered by the designers to determine the effect on the body of various forces and moments exerted on the moving body.

There are six main components of force and moment and three damping terms acting on a model illustrated in FIG. 10 that are of interest to designers in evaluating the flying qualities of such a body. As aircraft configurations have increased in complexity and capability, additional aerodynamic terms are now of significant interest to the designer. These include the coupled force and moment terms referred to as the rotary derivatives (also illustrated in FIG. 10). These thirteen aforementioned components are known by those skilled in the art as vertical force, axial force, side force, pitching moment, yawing moment, rolling moment, pitch damping, yaw damping, roll damping, as well as yaw moment due to roll rate, roll moment due to yaw rate, side force due to roll rate, and side force due to yaw rate. Determining the magnitude of these components acting on the body will determine the flying capability of the body and determine if the desired results can be achieved for most typical configurations. A full description of the aerodynamic terms is in FIG. 10.

Testing for one type of body or an object moving through the air can be for a towed decoy or drogue, such as shown in U.S. Pat. Nos. 4,852,455 and 6,056,236. One method of testing the quality and effects of these forces on a flying object in actual use is by photographic coverage of the object during actual flight. However, this requires that an actual full size body be utilized, and if the tests prove unsatisfactory, require redesign and rebuilding of the actual full size body. Likewise, these tests are expensive and do not provide the accuracy desired.

Recently, tests have been performed on such actual size moving bodies moving in flight by installing a six degree of freedom (DOF) sensor package inside the full size body which measures these various force components and eliminates the need for photographic measurements and provides increasingly reliable test results. However this requires a full size model and expensive in flight tests.

In order to avoid the costly expense of performing in flight tests, whether by photographic means or use of miniature inertia measurement devices in an actual size body, prototypes of the body, either full size or miniature, are tested in a wind tunnel. These models are mounted by various mounting arrangements within the wind tunnel and are provided with various strain gauges which measure the various forces acting on the body to better determine the affects on the body when a full size thereof moves through the air. One such type of six degree of freedom test apparatus is shown in U.S. Pat. No. 5,663,497. Other types of wind tunnel test apparatus and methods of retrieving the desired information are shown in U.S. Publication No. 2003/0000298 and U.S. Pat. No. 5,398,885.

Even though these devices may provide satisfactory inputs, they are relatively expensive to utilize and set up within restricted types of wind tunnels. Furthermore, these experimental methods and wind tunnel testing only measure the six static force and moment derivatives. In order to properly simulate and validate performance from an aerodynamic perspective, and consequently the resultant system design, a full description of the aerodynamic coefficients, to include damping and rotary derivative terms, is required. Inclusion of the coupled force terms is usually of less significance by virtue of the fact that they rarely represent terms of sufficient magnitude to be destabilizing. However, if available, their inclusion will provide a complete description of the aerodynamic performance of the device and so have been included within the design described herein.

The proposed adaptation of this technology in the present invention is designed to measure the time rate of change of the six degree of freedom state vectors of a wind tunnel model. The obtained data is utilized for the determination of the coupled rotary and damping aerodynamic derivatives for the device. The method and apparatus of the present invention eliminates the need for forced oscillation tests as heretofore used in the prior art and which are less desirable due to cost, and wherein the new approach yields improved accuracy over existing free oscillation techniques. The apparatus and method of the present invention is adaptable to forced oscillation driver mechanisms and considerably simplifies the measurement process.

Existing simulation capability for aerodynamic behavior of both towed and freefall or thrusted expendable devices includes the ability to account for not only the standard six force and moment components, but for both the coupled aerodynamic derivatives as well as damping terms. Due to cost of the testing required to accurately capture the dynamic coefficients, inclusion in simulated wind tunnel tests is limited at best, and most times the coefficients utilized are calculated values of the derivatives and not measured results.

Due to the complex nature of the aerodynamic behavior of these devices, the need exists for accurate determination of these coefficients. The configuration of most expendable decoys or drogues which is the preferred embodiment of the present invention, from an aerodynamic perspective, is such that the ratio of roll inertia to pitch and yaw inertia requires the inclusion of coupled terms in the governing differential equations of motion. Furthermore, a further description of the impressed aerodynamic moments, in particular those related to lateral aerodynamics, requires the inclusion of the rotary or cross derivatives.

Current aero-predictive codes provide insight into the trends these values can assume. However, due to the extremely complex nature of the driving aerodynamic phenomena, calculated values often contain sufficient error to corrupt simulation tests. Testing for these derivatives using current techniques is impractical due to the high cost. The proposed approach of the present invention provides a cost effective method and apparatus of measuring these derivatives with sufficient accuracy to meet modeling and simulation requirements in order to provide a true measure of system effectiveness.

Thus, the need exists for an improved method and apparatus for measuring the aerodynamic parameters, including damping and inertially coupled cross derivative terms, through elimination of heretofore extremely expensive forced oscillation balance systems wind tunnel testing by using commercially available miniature inertia sensors (MEMS) and data encoding apparatus which are mounted within the wind tunnel model of the desired device to be tested and transmitted, via either cable or telemetry transmitter, to the external recording system. MEMS is an acronym for "Micro Electro Mechanical Systems" which is the technology utilized in the processing of microchips as applied to miniature device fabrication, such as the micro-inertial sensors of the subject invention. Using MEMS, the gyroscopes and accelerometers of the present invention are made on chips, very inexpensively and accurate, which provides an alternative to the discrete sensors utilized in the system, and results in potential size reduction to be even more compatible with the size restrictions associated with wind tunnel test apparatus.

BRIEF SUMMARY OF THE INVENTION

An object of the present invention is to present an alternative measurement approach for the heretofore used six component flexure balance measuring method and apparatus by substituting an existing six degree of freedom measurement package within a device to be tested in a wind tunnel. The wind tunnel model is a mass balanced version designed to match not only the external configuration, but the inertia sensor and center of gravity vector yielding the correct frequency response. The present invention can be implemented in either of three manners; single, three and six degrees of freedom measurements.

Another feature of the invention is to provide the sensor package consisting of three accelerometers and three rate sensors, along with a pair of thermocouples, which are mounted within the model for measuring the analog sensor output as a function of time at a frequency sufficient to allow the reconstruction of the system response to the input force function. A further feature of the invention is measuring the full six degrees of freedom state vector for the system as a function of time and by integration of the sensor output system state vector determining the angular and linear displacement as a function of time for free fall wind tunnel experiments with the inclusion of the miniature telemetry transmitter as shown in FIG. 8.

In accordance with the present invention, the proposed approach to full aerodynamic characterization of a given body configuration begins with the measurement of the six static force and moment coefficients using conventional, known, apparatus. The sensor equipped model preferably is then tested on a single degree of freedom trunnion. This test will be repeated in each of the three mutually perpendicular axis defined in the body axis coordinate frame. The single degree of freedom testing provides the damping terms about each of the body axii.

In still further accordance with the invention a three degree of freedom test is utilized for the determination of the cross derivative terms by placing the body on a spherical model mount at the model center of rotation to allow full angular motion of the system and by integration of the time derivative of the system, state vectors provide the information necessary for determination of the coupled moment derivatives when combined with data taken in the static and single degree of freedom tests of the device.

Another feature of the invention is that the rate sensors are single degree of freedom quartz gyroscopes mounted within the model, (MEMS sensor technology is also incorporated as an alternative to quartz gyroscopes) such that the sensing axis is directed along one of the body axis. The three accelerometers located within the model provide an indication of the linear accelerations of the body. In the full six degree of freedom implementation, this is the actual function of the components during free fall wind tunnel testing. In a three or single degree of freedom implementation, the accelerometers provide a second indication of the angular motion about the pitch and yaw axii. Depending upon position, data can be obtained about the roll axis as well. The thermal sensors are utilized for monitoring of the temperature history of the rate sensors and accelerometers and the sensors selected are characterized for cross axis sensitivity. Each of the respective components preferably has minimum drift and cross axis sensitivity.

In summary, the proposed method and apparatus of the present invention provides a low cost alternative to current wind tunnel test techniques for the measurement of dynamic stability derivatives to include both damping terms and rotary derivatives. This invention is predicated upon existing demonstrated methods which yield high fidelity results. The invention minimizes impact to existing wind tunnel hardware and is easily implementable within current wind tunnel models. The method can be implemented in single, three, and six degrees of freedom, and the stability derivatives measured are precisely determined through usual analytical methods of data reduction. Thus, the present invention provides not only a reduced cost, but substantially improves the accuracy of the coefficients under evaluation and test results.

The foregoing advantages, construction and operation of the present invention will become more readily apparent from the following description and the accompanying drawings.

BRIEF DESCRIPTION OF THE DRAWINGS

A preferred embodiment of the invention, illustrative of the best mode in which applicant contemplates applying the principle, is set forth in the following description and is shown in the drawings and is particularly and distinctly pointed out and set forth in the appended claims.

FIG. 10 is a diagrammatic view of the model with coordinate frame located at the center of gravity and tabulation of forces and moment.

Similar numerals refer to similar parts throughout the drawings.

DETAILED DESCRIPTION OF THE INVENTION

Figure 1:
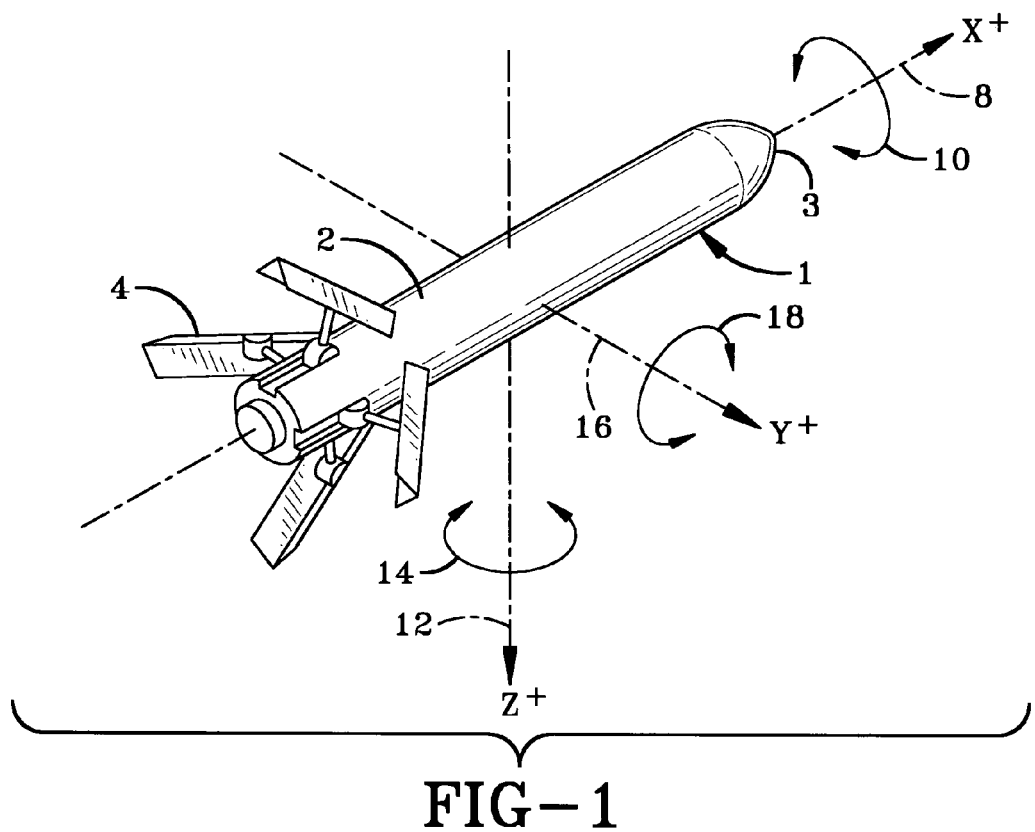
FIG. 1 is a diagrammatic perspective view of a model under test.

FIG. 1 is a diagrammatic perspective view of a model to be tested in a usual wind tunnel in accordance with the present invention. The model shown is a type of drogue or decoy indicated generally at 1, which is towed by a military aircraft, such as shown and described in U.S. Pat. No. 4,852,455. Model 1 consists of a generally cylindrical body 2 having a pointed nose 3 and a plurality of retractable and expandable fins 4. However, the concept and features of the present invention can be used for various types of free-fall bodies, projectile bodies, or self-powered bodies without departing from the concept of the invention, and need not be limited to such towed objects.

Figure 5:
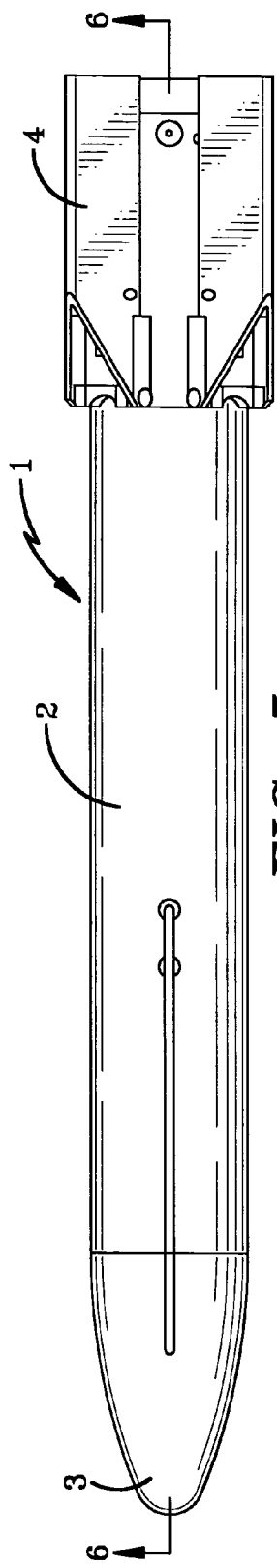
FIG. 5 is a top plan view of the model being tested by the method and apparatus of the six degree of freedom package of the present invention.
Figure 6:
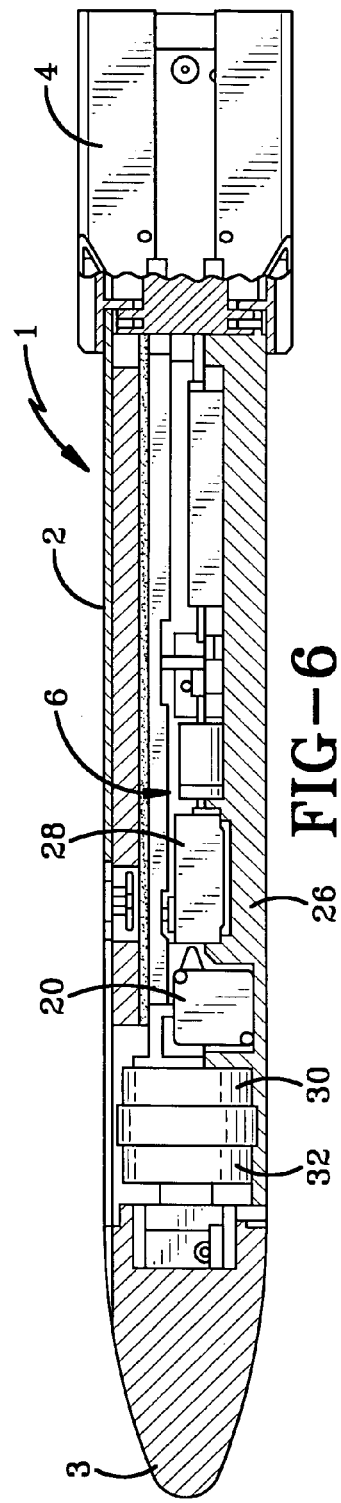
FIG. 6 is a sectional view taken on line 6—6, FIG. 5.
Figure 7:
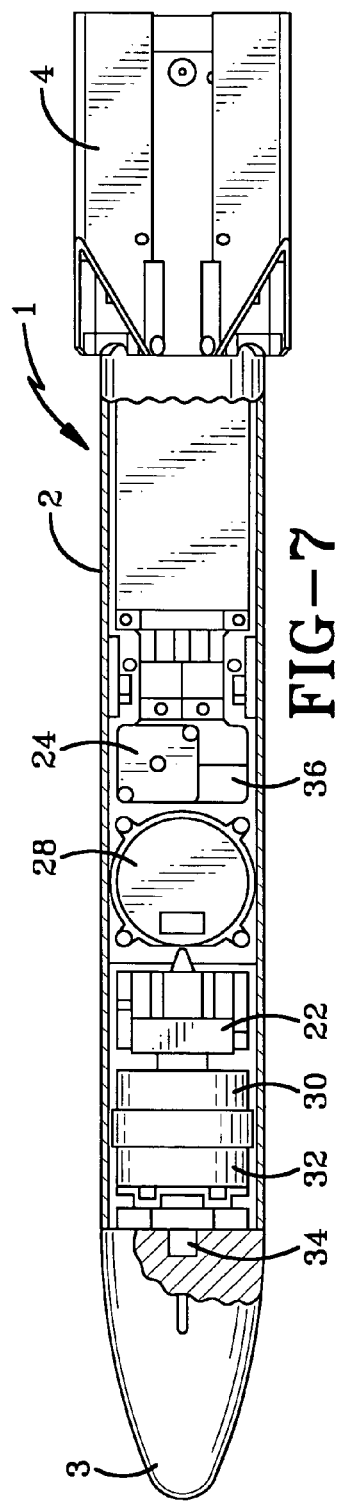
FIG. 7 is a top sectional view of the model as shown in FIG. 6.

The details of the apparatus of the present invention, and in particular the miniature six degree of freedom package, is shown particularly in FIGS. 5–7 and is indicated generally at 6. The six forces acting on model 1 are shown particularly in FIG. 1 and includes an axial force 8 and a roll moment 10, which are associated with the X axis, a yaw moment 14 and a vertical force 12 which are associated with the Z axis, and a side force 16 and a pitching moment 18 which are associated with the Y axis. These represent the traditional six degree of freedom forces and moments which a body moving through the air will experience and whose effect is determined by current apparatus. The present invention measures the dynamic derivatives about those same axis and includes the coupled force and moment derivatives as noted in FIG. 10, and pitch damping 48, yaw damping 49, roll damping 50, yaw moment due to roll rate 51, roll moment due to yaw rate 52, side force due to roll rate 53 and side force due to yaw rate 54.

The six degree of freedom package of the present invention is shown mounted within the cylindrical body 2 of a model 1 in FIGS. 5–7. Package 6 is the same as that which was previously used in an actual flight tested device, but in accordance with the invention, is incorporated into a wind tunnel test to provide a considerably less expensive test and which provides higher quality results than heretofore possible with actual in-flight tests or traditional forced oscillation balance wind tunnel tests and equipment.

Package 6 consists of three accelerometers consisting of a lateral accelerometer 20, a longitudinal accelerometer 22, and a vertical accelerometer 24 for measuring the accelerations acting on the body in the Y, X and Z axis, respectively. These accelerometers are mounted on a support housing 26 secured within body 2. Package 6 further includes three rate sensors (gyros), including a roll sensor 28, a pitch sensor 30, and a yaw sensor 32 for measuring the moment forces about the X, Y and Z axii, respectively. Package 6 preferably includes a pair of thermal sensors, preferably in the form of thermistors, indicated at 34 and 36 (FIG. 7). Rate sensors 28, 30, and 32 preferably are single degree of freedom quartz gyroscopes of the type manufactured by Systron Donner Inertial Division of BEI Technologies, Inc. as model number QRS 11. One example of accelerometers 20, 22, and 24, which can be used in package 6, is manufactured by IC Sensor Division of Measurement Specialties, Inc. designated as model 3145. Thermal sensors 34 and 36 are usual thermistors well known in the art. The proposed embodiment can utilize alternate sensor technology such as MEMS without impact to form, fit or function.

Figure 2:
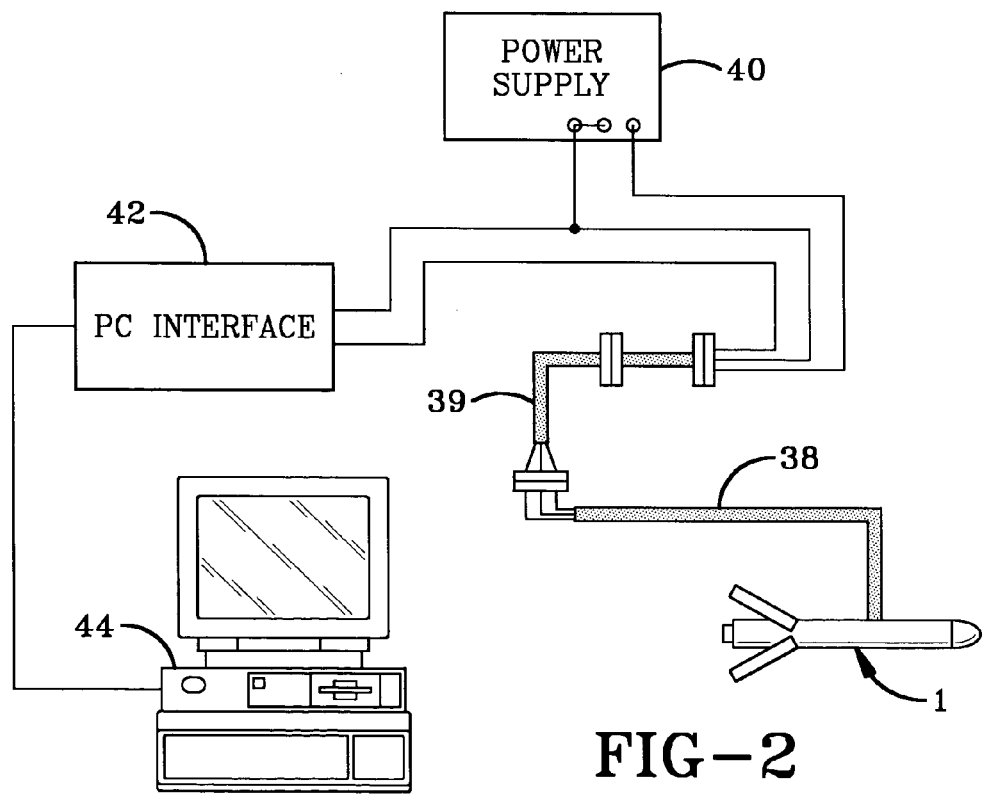
FIG. 2 is a diagrammatic view of the arrangement for measuring the forces exerted on the model in the wind tunnel.
Figure 8:
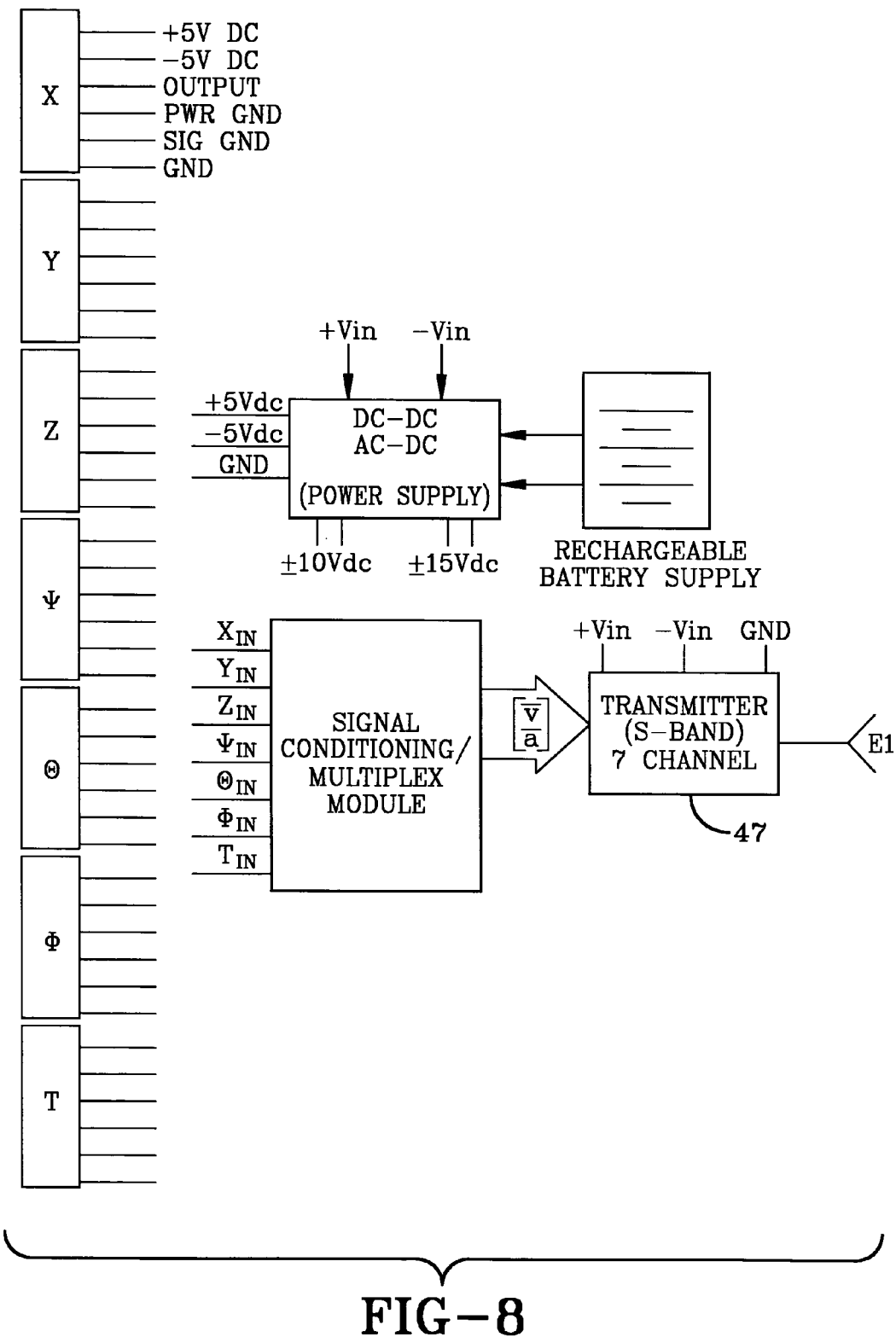
FIG. 8 is a block diagram of the signal processing equipment analyzing the signals received from the test model.

Package 6 will be connected by various wiring harnesses 38 and 39, which extend from the model 1, as shown in FIG. 2, to a power supply 40, a PC interface 42, and a computer system 44. A separate miniature telemetry system 47 is added, FIG. 8, for free fall wind tunnel testing.

Figure 3:
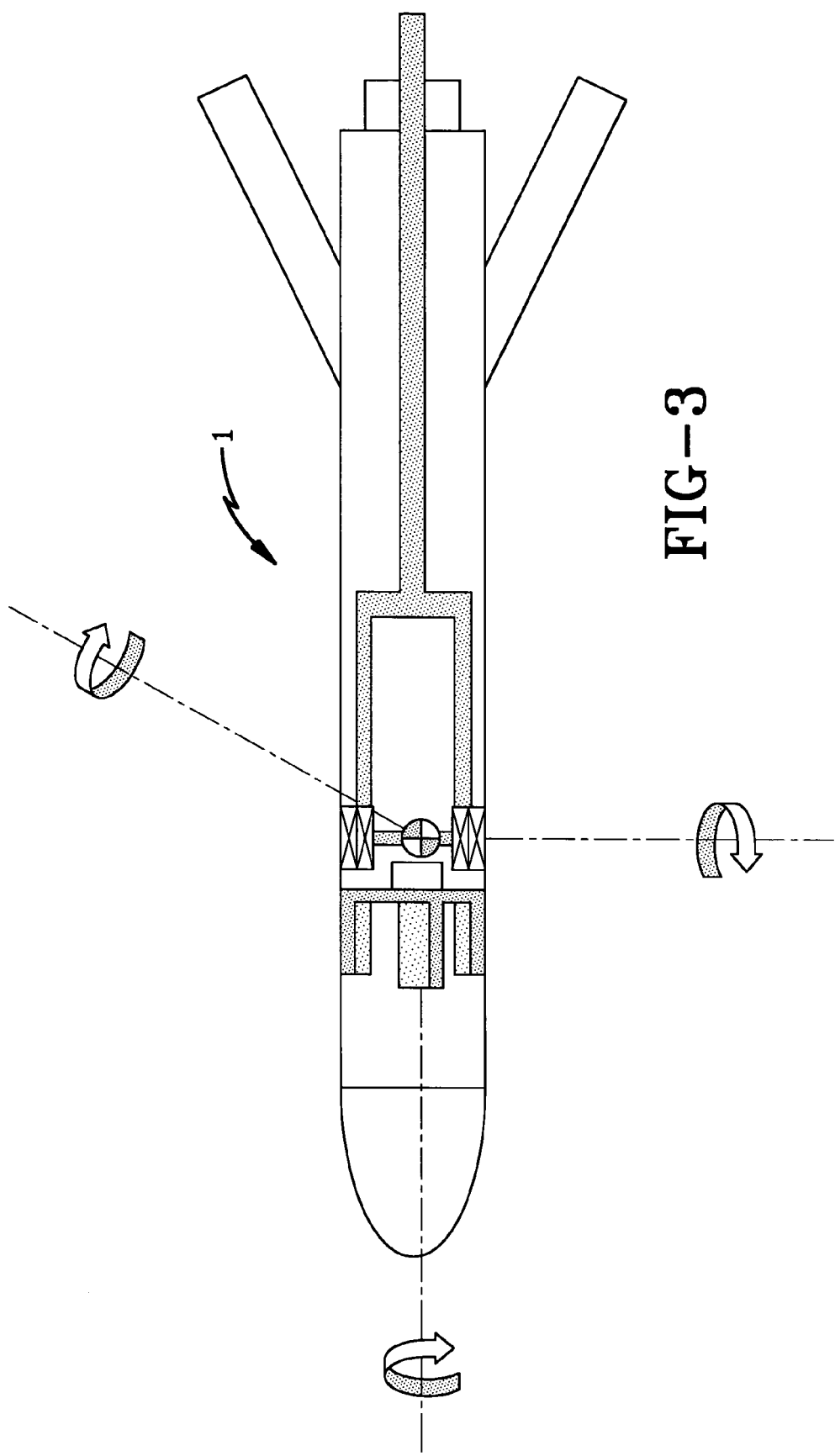
FIG. 3 is a diagrammatic view single degree of freedom configuration (yaw plane example)
Figure 4:
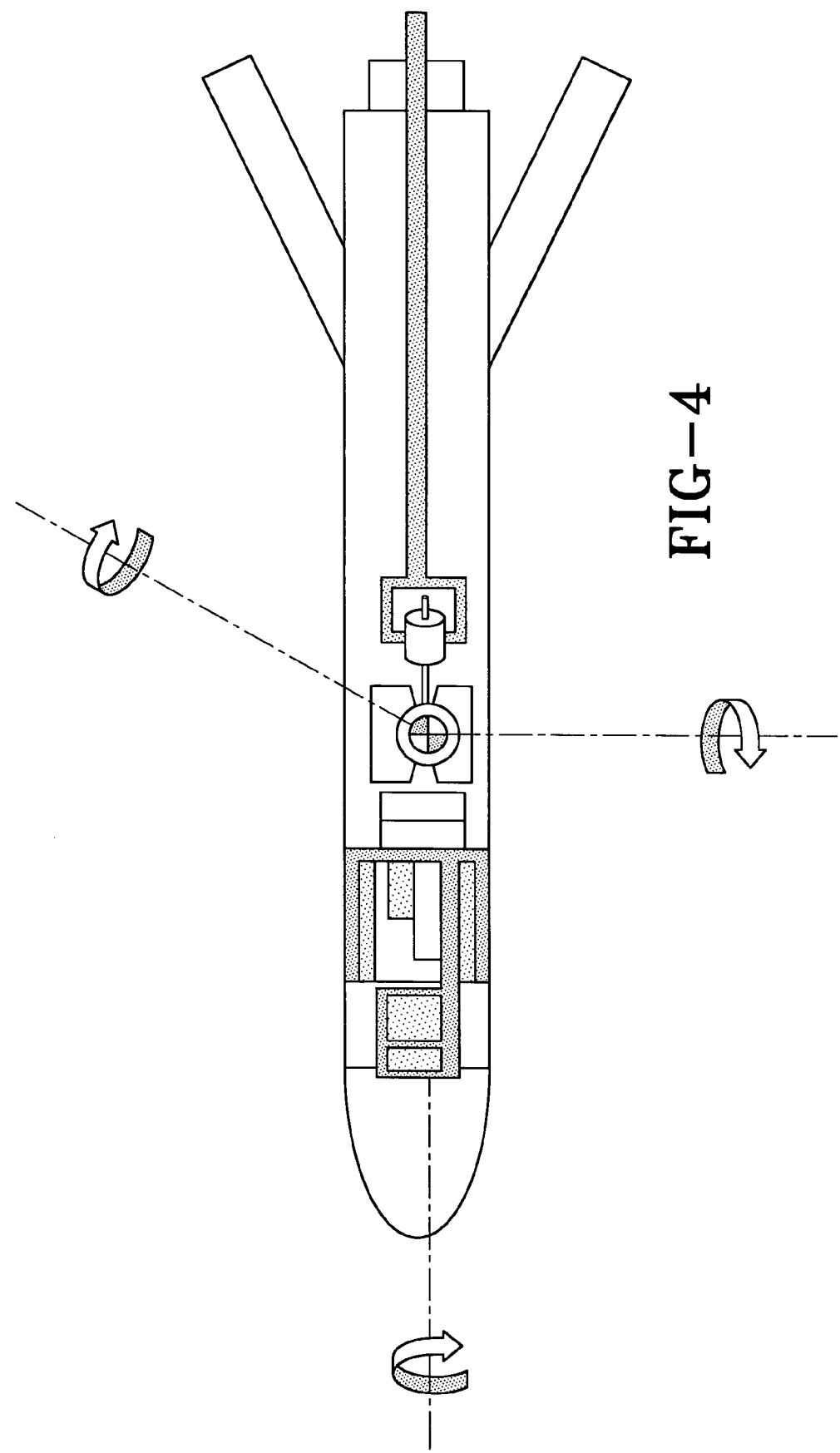
FIG. 4 is a diagrammatic view of the three degree of freedom configuration.

The proposed approach to full aerodynamic characterization of a given model configuration begins with measurement of the six static force and moment coefficients which is carried out by equipment and methods well known in the wind tunnel testing art. The sensor equipped model then is tested on a single degree of freedom trunnion as shown in FIG. 3. This test is repeated in each of three mutually perpendicular axis defining the body axis coordinate frame. The single degree of freedom testing provides the damping terms about each of the body axis.

A three degree of freedom test is utilized next in the determination of the cross derivative rate dependent terms. In this test, a spherical model mount preferably located at the model center of rotation (CG), such as a spherical bearing or gas bearing, forms the gimbals which allow full angular motion of the system. Integration of the time derivative of the system state vector provides the information necessary for determination of the coupled moment derivatives when combined with data taken in the static and single degree of freedom dynamic tests of the device.

This approach is also applicable to classic forced oscillation tests in which an electric shaker system within the forced oscillation balance forces the model to oscillate on the sting support system (not shown). In this case, the proposed sensor suite would provide a low cost alternative to measurements taken with a five component flexure balance. In the event that a full six degree of freedom response is desired from the model under test, modifications to the sting support system can be made to allow the rotational mount to ride in a linear gimble producing motion along each of the three body axis which yields the remaining coupled force derivatives. Alternately, a free fall wind tunnel test, when combined with the aforementioned static, 1 DOF, and 3 DOF tests can be utilized to obtain the remaining coupled force derivatives. This technique would enable the coupled force derivatives to be determined from the measurement taking full advantage of the entire sensor package output. The resultant aerodynamic coefficients provide all terms for full characterization in simulations.

The technology of the present invention is predicated upon miniature accelerometers and rate sensors developed for use in both commercial and defense related projects. The advanced sensor technology has been combined with signal processing techniques developed based upon inertial navigation theory. The resulting combination of hardware measurement and data reduction enables the extraction of the motion history for the device. When combined with a prior data on the configuration under test, the final data products are extracted.

In summary, the sensor package of the present invention necessary to evaluate the coefficients consists of three rate sensors, three accelerometers and two thermal sensors. The rate sensors are single degree of freedom quartz gyroscopes mounted within the unit such that the sensing axis is directed along one of the body axis. The three accelerometers located within the package ordinarily provide an indication of the linear accelerations of the body. In the full six degree of freedom implementation this is the actual function of the components. In the three or single degree of freedom implementation, the accelerometers provide a second indication of the angular rates about the pitch and yaw axis. Dependent upon position, data can be obtained about the roll axis as well. The thermal sensors are utilized for monitoring of the temperature history of the rate sensors and accelerometers and the sensors selected have been characterized for cross axis sensitivity.

Figure 9:
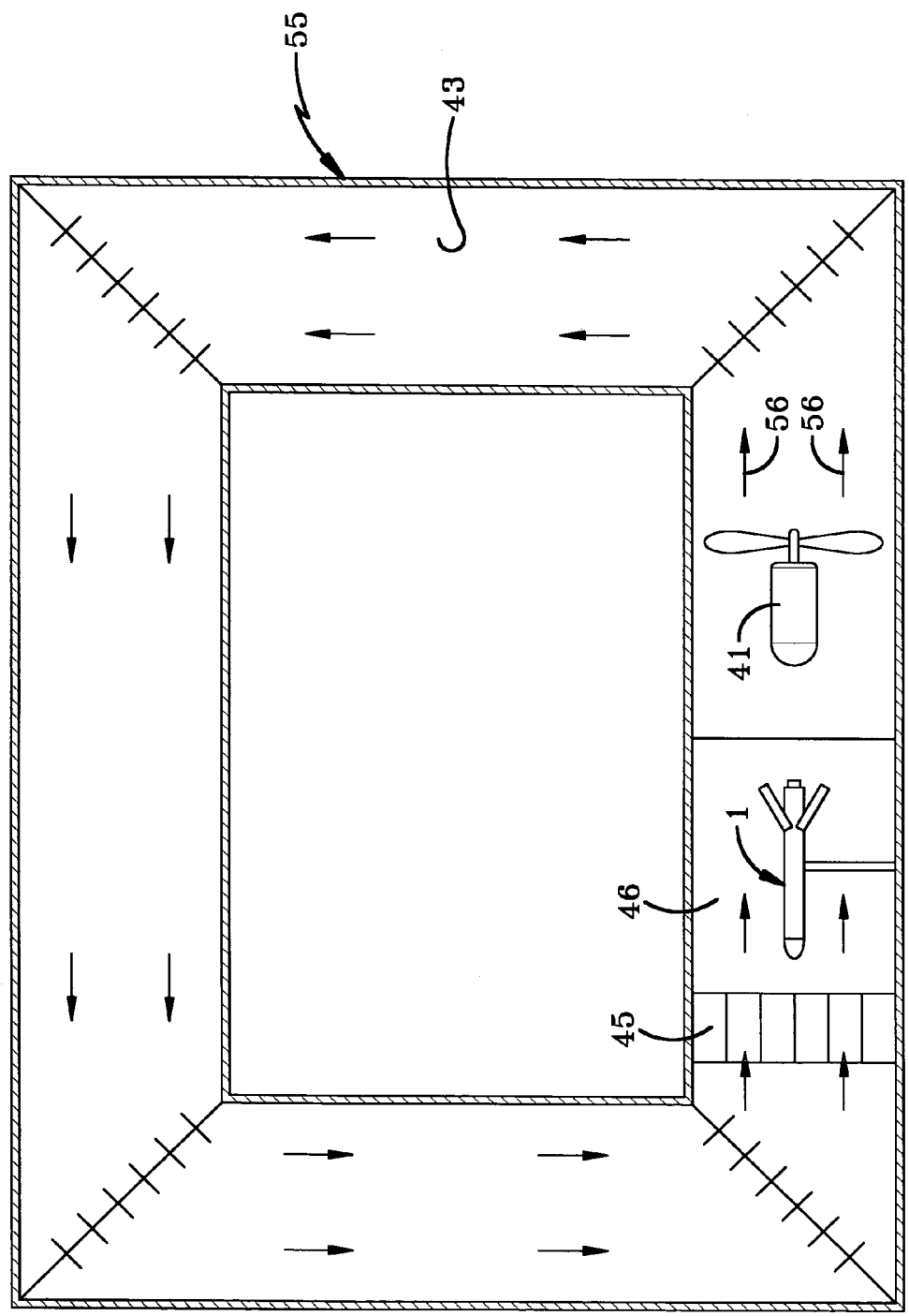
FIG. 9 is a diagrammatic view of the model being tested within one type of wind tunnel.

In carrying out the invention a test plan is written which contains sample profiles with motion confined to a single plane as well as combined motions in two and three planes. Data is extracted for each of the test cases run. An input drive signal is reconstructed for each case up to the limit of the bandwidth of the sampling device. In a test situation, the data was taken by varying the input frequency for a +/−45 degree roll rate with a small amplitude pitch and yaw rate superimposed. The test was run for a full sixty seconds in order to determine the effect of sensor drift on the integrated response. When considering wind tunnel tests, the average run lasts for approximately 20 seconds using a typical blow down tunnel or a continuous path tunnel as shown in FIG. 9. Integration of the sensor response provided an accurate recreation of the input drive signal for each channel. The data presented is typical for the response of each test performed. Improved fidelity is possible through selection of sensors whose bandwidth is matched to the expected system response. In addition, increased sample frequency as well as additional corrections to account for thermal drift improve the accuracy of the measurement. The demonstrated response with the current sensor package is of sufficient fidelity to enable the extraction of the dynamic stability derivatives within acceptable accuracy requirements.

A method is proposed which provides a low cost alternative to current wind tunnel test techniques for the measurement of dynamic stability derivatives to include both damping terms and rotary derivatives. The technique is predicated upon existing demonstrated methods which yield high fidelity results. The technique minimizes impact to existing wind tunnel hardware and is easily implementable within current wind tunnel models. The proposed technique can be implemented in single three and six degrees of freedom. The stability derivatives measured were previously determined through analytical methods of reduced accuracy consequently the proposed approach provides not only a reduced cost technique but substantially improves the accuracy of the coefficients under evaluation.

FIG. 9 shows one example of a wind tunnel indicated generally at 55 in which the object or model 1 being tested is mounted. This type of wind tunnel is referred to as a continuous path wind tunnel wherein a blower 41 produces a high pressure air stream indicated by arrows 56, which moves about a path 43 before entering through a plurality of baffles 45 into the test area 46 where model 1 is mounted by the spherical mount or other type of mounting mechanism. Other types of wind tunnels can be used other than the continuous path example shown in FIG. 9 without affecting the concept of the invention.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. Apparatus for measuring damping and rotary derivatives of an object in a wind tunnel comprising:

a wind tunnel;

an object to be tested mounted in the wind tunnel;

a mounting mechanism for supporting the object in the wind tunnel to provide unrestrained linear and angular motion of the object when subjected to wind tunnel forces;

a sensor package mounted within the object including three rate sensors for measuring angular rates about the axii of the object and three accelerometers for measuring linear accelerations acting along the axii of the object; and a computer system for receiving the measured angular rates and measured linear accelerations from the sensor package and determining the damping and rotary derivatives of the object from said measured angular rates and linear accelerations.

2. The apparatus defined in claim 1 wherein the sensor package further includes two thermal sensors for monitoring the temperature history of the rate sensors and accelerometers.

3. The apparatus defined in claim 1 wherein the rate sensors are single degree of freedom quartz gyroscopes.

4. The apparatus defined in claim 1 wherein the rate sensors are MEMS gyroscopes.

5. The apparatus defined in claim 3 wherein each of the gyroscopes is mounted along a respective one of the axis of said object.

6. The apparatus defined in claim 1 wherein the mounting mechanism is a spherical mount.

7. The apparatus defined in claim 6 wherein the mounting mechanism is a spherical bearing.

8. The apparatus defined in claim 1 wherein the mounting mechanism is a gas bearing.

9. The apparatus defined in claim 1 wherein the mounting mechanism is located at the center of rotation of the object.

10. The apparatus defined in claim 1 wherein a miniature telemetry package is integrated with the sensor package to provide autonomous transmission of aerodynamic data to the computer system.

11. The apparatus defined in claim 1 wherein the sensor package includes a mounting plate located within a hollow interior of the object; and in which the rate sensors and accelerometers are mounted on said plate.

12. A method of measuring damping and rotary derivatives of an object in a wind tunnel comprising the steps of:

providing the object with three rate sensors and three accelerometers:

mounting the object in a wind tunnel on a device providing full angular and linear motion of said object;

subjecting the object to wind forces in the tunnel;

measuring the angular rates individually about X, Y and Z axii of the object;

measuring the linear accelerations individually along the X, Y and Z axii of the object; and calculating the rotary and damping derivatives of the object from the measured angular rates and measured linear accelerations.

13. The method defined in claim 12 including the step of providing the object with two thermal sensors.

14. The method defined in claim 12 wherein the step of mounting the object in the wind tunnel includes mounting the object on a spherical mounting to allow the full angular motion of the body.

15. The method defined in claim 14 including the steps of determining the center of gravity of the body; and supporting said body on the spherical mounting at the center of gravity.

16. The method defined in claim 12 including the steps of mounting the object on a release mechanism, releasing the object, and recording the data transmitted via miniature telemetry transmitter.

17. A method of measuring damping and rotary derivatives of an object having three axii in a wind tunnel comprising the step of:
 a) measuring the three static forces ($C_x$, $C_y$, $C_z$) and three moment values ($C_m$, $C_l$, $C_n$) on the object;
 b) measuring the dynamic damping derivatives ($C_{mq}$, $C_{lp}$, $C_{nr}$) about each of the three individual body axii;
 c) allowing full angular movement to the object;
 d) determining the coupled moment derivatives ($C_{np}$ & $C_{lp}$) by combining the measured static forces and moment values of step (a) and the measured damping derivatives of step (b);
 e) providing full unrestrained motion of the object;
 f) measuring the linear accelerations along the three axii of the object; and
 g) determining the coupled forces ($C_{yp}$ & $C_{yr}$) acting on the object by combining the full angular movement of step (c) with the static force and moment value measurements of steps (a) and (b) and coupled moment derivatives of step (d).

18. The method defined in claim 17 wherein the step (d) includes mounting the object on a spherical mount at the center of rotation of the object.

19. The method defined in claim 17 wherein the step (b) includes the step of mounting a rate sensor along each of the object axii for measuring angular rates about each of said object axii; and wherein step (e) includes the step of placing an accelerometer on each of the object axii for measuring the linear accelerations acting along each of said axii.

20. The method defined in claim 19 including the step of monitoring the temperature history of the rate sensors and accelerometers.

\* \* \* \* \*